(12) United States Patent
Tinklenberg

(10) Patent No.: US 7,108,408 B2
(45) Date of Patent: Sep. 19, 2006

(54) MOUNTING KIT FOR TRAILER LIGHT

(75) Inventor: Terry J. Tinklenberg, Edgerton, MN (US)

(73) Assignee: C.M.T. Mfg. Inc., Edgerton, MN (US)

( * ) Notice: Subject to any disclaimer, the term of this patent is extended or adjusted under 35 U.S.C. 154(b) by 0 days.

(21) Appl. No.: 10/707,742

(22) Filed: Jan. 8, 2004

(65) Prior Publication Data

US 2004/0179369 A1    Sep. 16, 2004

(51) Int. Cl.
*B60Q 1/00*    (2006.01)
(52) U.S. Cl. ........................ 362/485; 362/418; 362/540
(58) Field of Classification Search ................. 362/485, 362/540–542, 498–499, 418, 449–450; 340/907
See application file for complete search history.

(56) References Cited

U.S. PATENT DOCUMENTS

| 3,487,359 | A | * | 12/1969 | McClintock | ................. | 362/540 |
| 4,286,309 | A | * | 8/1981 | Rasinski | ..................... | 362/549 |
| 5,544,022 | A | * | 8/1996 | Blackard | .................... | 362/477 |
| 6,409,367 | B1 | * | 6/2002 | Pratt | .......................... | 362/505 |
| 6,607,285 | B1 | * | 8/2003 | Citron et al. | ................ | 362/250 |
| 6,655,822 | B1 | * | 12/2003 | Sylvester | .................... | 362/485 |

* cited by examiner

*Primary Examiner*—Ali Alavi
(74) *Attorney, Agent, or Firm*—Schwegman, Lundberg, Woessner & Kluth, P.A.

(57) ABSTRACT

The invention includes a trailer light kit. The kit comprises: a bracket for mounting a light to a trailer, the bracket including an extension holder; an extension, insertable into the extension holder; and a light mechanism, comprising a light and a light harness for attaching the light into a trailer receptacle.

10 Claims, 3 Drawing Sheets

MOUNTING KIT FOR TRAILER LIGHT

TECHNICAL FIELD

The invention herein relates to a mounting kit for mounting a trailer light; and to a method for mounting a trailer light. The present invention also includes a method for improving safety of a flatbed trailer.

BACKGROUND ART

One problem that drivers face when driving an auto or truck with a trailer, such as a flatbed trailer is that the lights on the trailer are mounted very low to the ground. As a consequence, the lights are difficult for other drivers to see because of their position and because they tend to become covered with dirt. The visibility problem is worsened by inclement weather.

DISCLOSURE

Figure 1:
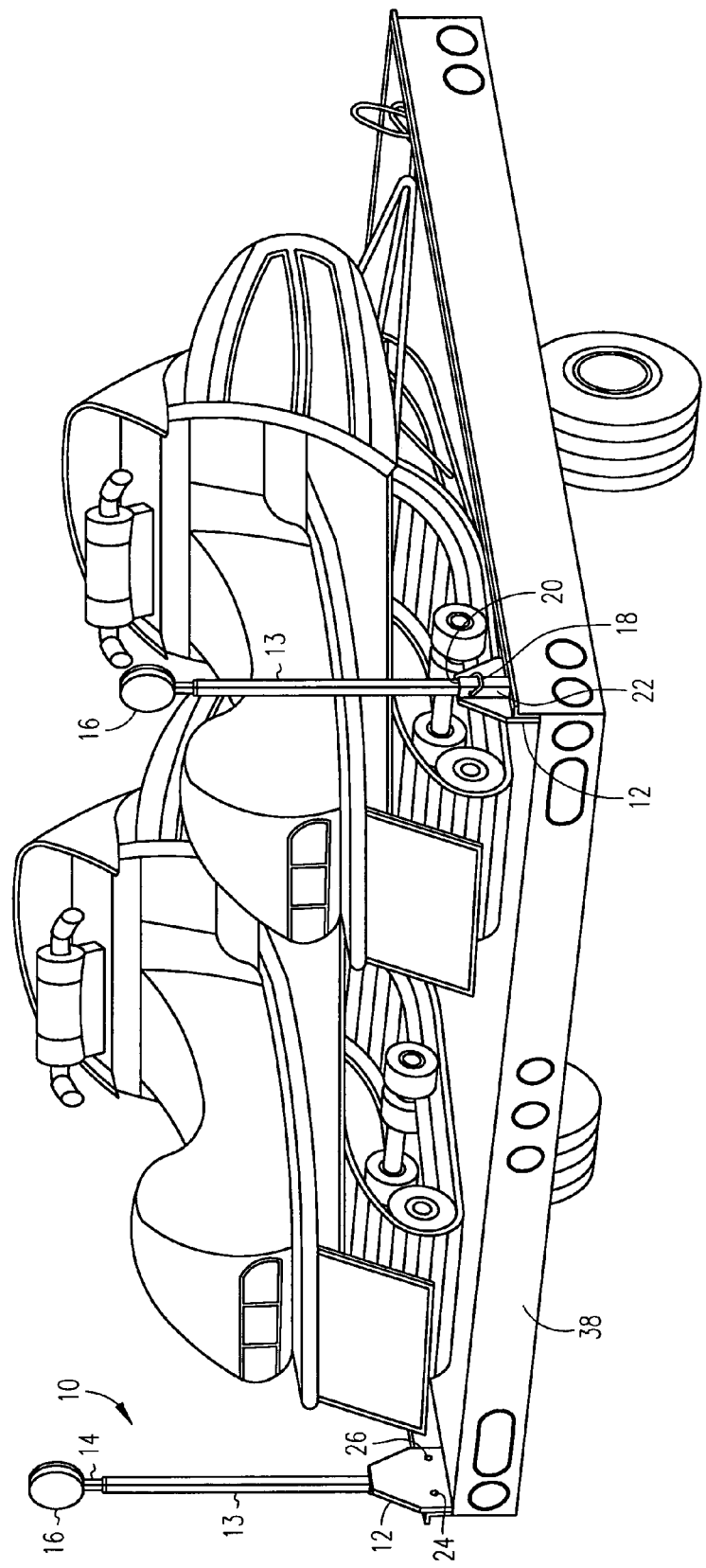
FIG. 1 is a perspective view of the trailer light kit of the invention, wherein trailer lights are mounted on a trailer.

The invention described herein includes a trailer light kit; a method for making a trailer light kit; a method for using a trailer light kit; and a method for improving safety of a flatbed truck. The trailer light kit of the invention, illustrated generally at 10 in FIG. 1, includes a mounting bracket 12, an extension 13 and a harness 14 for attaching a light 16 to a trailer's light receptacle 18. The components of mounting bracket 12, and extension 13, are, in one embodiment, made from aluminum.

The extension 13 is held by the bracket 12 by insertion in orifice 20, defined by holder 22 which is attached to the bracket 12. In one embodiment, the light harness 14 is weather sealed. The trailer light kit 10 further includes a forward facing marker light 40, shown in FIG. 2B and a rear facing signal light 16, shown in FIG. 1.

As used herein, the term "forward facing" refers to a marker light that faces a vehicle pulling a trailer when the trailer light kit is installed on a trailer. The term, "rear facing" refers to a signal light that faces away from the vehicle pulling the trailer when the trailer light kit 10 is installed on a trailer. The rear facing light 16 approximately doubles the lit area of the trailer and enables drivers to see the rear of the trailer in the dark. By increasing the lighting, the kit of the invention reduces risk of damage to the trailer and to articles hauled by the trailer. The rear facing signal light conveys turn and stop signal information to other drivers. In one embodiment, the forward facing marker light is amber and the rear facing signal light is red.

The bracket 12 includes two orifices 24 and 26 for insertion of a fastening device, such as a bolt or screw. The holder 22 defines a bore hole 28 for insertion of a pin, which is not shown.

Figure 2A:
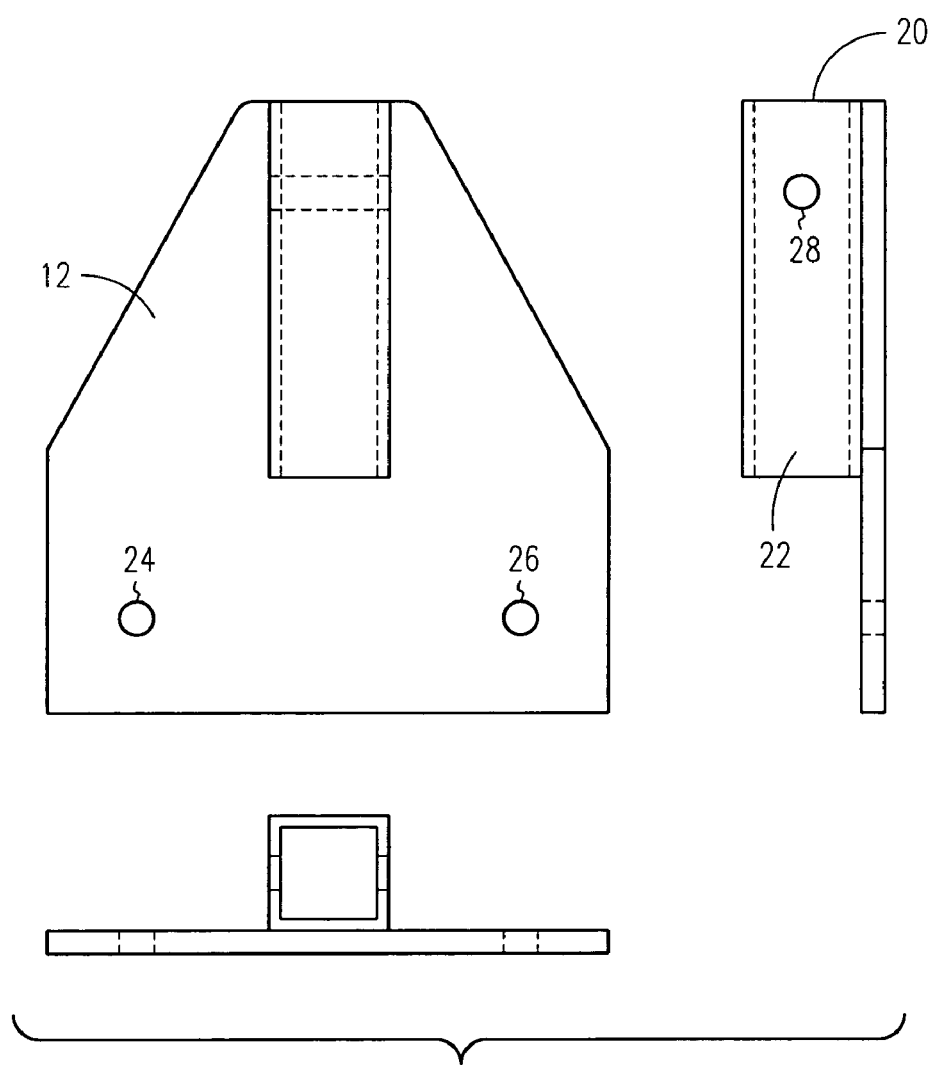
FIG. 2A is a top plan view of a mounting base component of the trailer light kit of the invention.
Figure 2B:
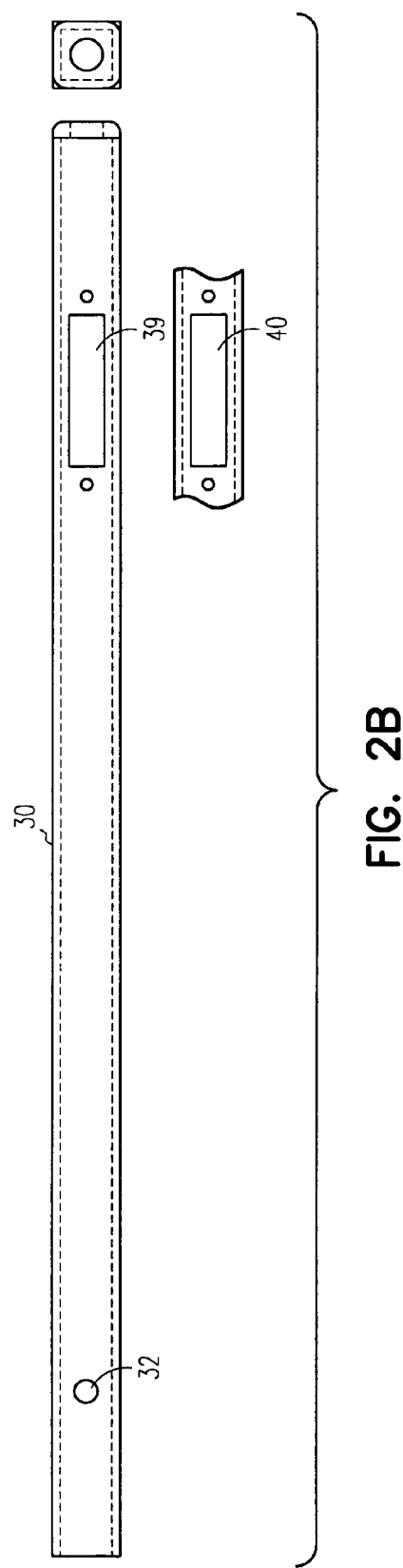
FIG. 2B is a top plan view of an extender component of the trailer light kit.

The extension 13 includes a hollow tube 30 with an orifice 32, shown in FIG. 2B, for receiving the pin that is not shown. The hollow tube 14 also defines an opening 34 that acts an orifice for receiving the amber marker light 40. The marker light 40 is positioned so that it is forward facing when installed on the trailer 38. The harness outlet for the light 16 passes through the bottom of the hollow tube 30 of extension 13. While an opening 34 is shown, it is understood that other types of anchoring mechanisms are usable for anchoring or attaching the marker light 40 to the hollow tube 30. In one embodiment, the marker light 40 is welded to the hollow tube 30.

The extension 13 is mounted onto the trailer 38 so that the light 16 is at least at an eye level height of an adult person of average height. By average height is meant a person having a height within a range of five feet to six feet, six inches. The harness 14 that includes wiring from the light 16 passes through the hollow tube 13 and out the conduit outlet. The harness 14 includes a plug mechanism for plugging into a receptacle of the trailer.

For some embodiments, the light 16 is screwed into threads, which are not shown, in the hollow tube 30. For other embodiments, the light 16 is integrally fabricated with the tube 30.

The trailer light kit additionally includes, in one embodiment, directions for installation on a trailer.

The trailer light kit of the invention is usable for providing elevated illumination of rear brake lights, running lights and turn signals, performed with light 16. The elevated illumination aids in preventing damage to the trailer, and articles hauled by the trailer, such as snowmobiles and ATV's because the signal lights 16 are more visible to other drivers. The forward facing light 40 acts to improve visibility of the trailer. In particular, the trailer light kit of the invention prevents the signal trailer lights 16 from becoming dirty or covered with snow or mud because of their elevation. The rear mounted lights 16 increase the lit area of the trailer and enable drivers to see the rear of the trailer in the dark. By increasing the lighting, the kit of the invention reduces risk of damage.

Installation and removal of the kit on a trailer is quick and easy. To remove the kit, a user need only pull the pin extending into orifice 32, that holds the hollow extension tube 30 to the bracket 12 and unplug the wire harness. The hollow extension tube 30 with lights 16 and 40 is then removed from the trailer.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

The invention claimed is:

1. A trailer light kit comprising: a bracket for mounting a light to a trailer, the bracket including a extension holder a vertical extension, effective for moving the light up or down; insertable into the extension holder; and a light mechanism, comprising a light and a light harness for attaching the light into a trailer receptacle wherein the light mechanism comprises a marker light and a signal light.

2. A trailer comprising a light made with the kit of claim 1.

3. The trailer light kit of claim 1, wherein the marker light is amber and the signal light is red.

4. The trailer light kit of claim 1 wherein the signal light faces away from a vehicle hauling the trailer.

5. The trailer light kit of claim 1 wherein the marker light faces a vehicle hauling the trailer.

6. The trailer light kit of claim 1, wherein the bracket and extension are made of aluminum.

7. The trailer light kit of claim 1, wherein the extension has a height effective for illuminating lights of a vehicle hauling the trailer.

8. The trailer light kit of claim 1, wherein the extension has a height that is at the eye level of an adult human of average height.

9. The trailer light kit of claim 1, further comprising a pin for insertion into a bore hole of the extension.

10. The trailer light kit of claim 1, further comprising directions for installation.

* * * * *